United States Patent [19]
Saito

[11] Patent Number: 4,481,543
[45] Date of Patent: Nov. 6, 1984

[54] PLAYBACK APPARATUS FOR PRODUCING STILL IMAGES

[75] Inventor: Etsuro Saito, Ayase, Japan

[73] Assignee: Sony Corporation, Tokyo, Japan

[21] Appl. No.: 358,851

[22] Filed: Mar. 17, 1982

[30] Foreign Application Priority Data

Mar. 30, 1981 [JP] Japan ............................... 56-47011

[51] Int. Cl.³ ..................... G11B 5/04; G11B 5/008
[52] U.S. Cl. ................................ 360/10.1; 360/35.1; 360/97
[58] Field of Search ............... 358/312, 342; 360/10.1, 360/35.1, 97, 101; 369/43

[56] References Cited

U.S. PATENT DOCUMENTS 2,955,157 10/1960 Young ................................ 360/35.1
4,058,840 11/1977 Kasprzak ........................... 360/10.1

FOREIGN PATENT DOCUMENTS 1426916 3/1976 United Kingdom ............... 360/10.1

Primary Examiner—Robert L. Richardson
Attorney, Agent, or Firm—Hill, Van Santen, Steadman & Simpson

[57] ABSTRACT

A still image playback apparatus which has a single playback head which is mounted on a head positioning means adjacent a magnetic disc which is rotated at the field frequency and wherein the disc has a plurality of concentric tracks each of which carry video signals of one field. The playback head is moved by the head positioning means from one of the tracks to an adjacent track so that video signals of one still image corresponding to two field periods of standard television signals are obtained during playback from the playback head when the disc has been rotated twice.

7 Claims, 6 Drawing Figures

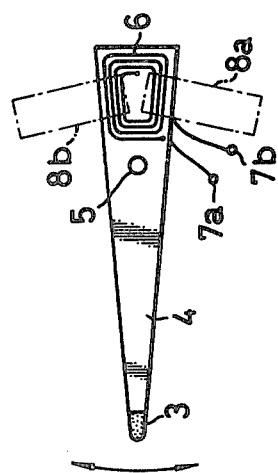
FIG. 4A
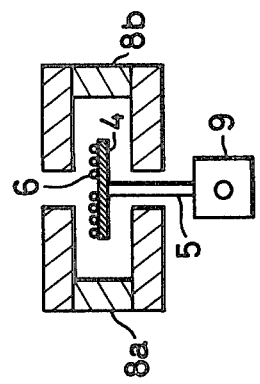
FIG. 4B
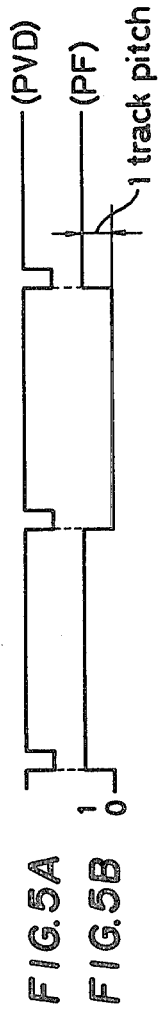
FIG. 5A (PVD)
FIG. 5B (PF)

PLAYBACK APPARATUS FOR PRODUCING STILL IMAGES

BACKGROUND OF THE INVENTION

1. Field of the Invention

This invention relates in general to a playback system for producing still images using a disc recording medium.

2. Description of the Prior Art

A still camera incorporating a still image playback system which is called an electronic camera has recently been proposed. The image photographed by an electronic camera of the type described can be directly reproduced by a TV receiver without requiring photographic development using silver compounds. The present invention relates to a still image playback system which is suitable for incorporation into a system with a still camera.

In a conventional still image playback system of the video disc recorder type having a magnetic disc and a magnetic head, two or more magnetic heads are mounted adjacent the magnetic disc. The reproduced output signals from the two magnetic heads are switched for every field (1/60 sec) of a standard television signal so as to obtain a frame still image which consists of two fields. The frame still image is advantageous in achieving high resolution. The flickering inherent in frame playback is prevented when the object to be photographed is stationary.

In contrast, the field still image which is obtained by repetitive playback of video signals for one field is inferior in resolution to the frame still image. However, recording data can be reduced to half that required for the frame still image system. Thus, a greater number of still images can be recorded on a single magnetic disc using the field still image system than in the frame still image system. Thus, it is preferable that a still image playback system be capable of producing both the field still image as well as the frame still image and be utilized depending upon the type of still images which are to be recorded.

SUMMARY OF THE INVENTION

It is an object of the present invention to provide a still image playback system which is capable of reproducing both field still images and frame still images and uses a switching operation.

It is also an object of the invention to provide a still image playback system which requires only a single playback head and which does not require the mounting of a plurality of heads with high precision or switchover of heads outputs and which is simple in construction.

According to the invention there is provided a still image playback apparatus comprising a single playback head which is mounted on a head positioning means adjacent a disc recording medium which is rotated at a field frequency and has a plurality of concentric tracks on each of which video signals of one field period can be recorded. The playback head is moved by the head positioning means from one of the tracks to an adjacent track so that video signals of one still image corresponding to two field periods of standard television signals can be obtained from said playback head when the recording medium is rotated twice.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 4A comprises a plan view of a mounting mechanism of the magnetic head according to the invention;

FIG. 4B comprises a sectional view of the mounting mechanism of the magnetic head according to the invention; and FIGS. 5A and 5B comprise plots of wave forms for explaining an embodiment of the invention.

DESCRIPTION OF THE PREFERRED EMBODIMENTS

Figure 1:
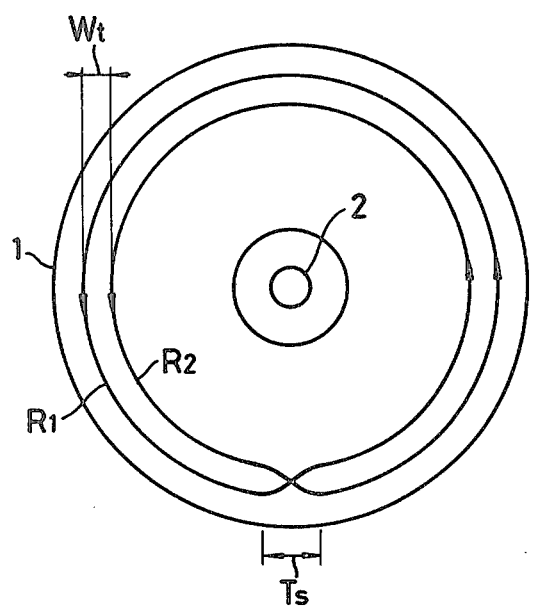
FIG. 1 illustrates a magnetic disc and shows the scanning pass of a magnetic head according to one embodiment of the present invention.

FIG. 1 illustrates a recording disc medium 1 that may be a magnetic disc which has a plurality of concentric recording tracks R1 and R2 with each recording track corresponding to one field of a video signal. A through hole 2 is formed in the center of the magnetic disc 1 for receiving a rotating spindle. When the magnetic disc 1 is rotated at the field frequency with the recording head stationary and FM modulated video signals being applied to the recording head during the recording mode, FM modulated video signals corresponding to one field will be recorded during a single rotation of the magnetic disc 1 thus providing the magnetic disc 1 a field still image. The playback of the field still image can be performed while maintaining the playback head stationary.

If the first field of the video signal for one frame is recorded on a single recording track, the recording head is radially displaced by a distance corresponding to the track pitch Wt (e.g., 0.14 mm), and the second field is then recorded as an adjacent recording track on the magnetic disc and the frame still image is thus obtained. So as to reproduce the video signals from the magnetic disc for a frame still image, FM modulated video signals of the first field are reproduced along the scanning path R1 and then the scanning position of the head is moved to the adjacent recording track and the FM modulated signals of the second field are then reproduced from the scanning path R2. The scanning position of the head then returns to the original position and the head moves on the scanning path R1 again. This operation is repeated and the change in the scanning position between tracks R1 and R2 is accomplished within the switching time interval Ts of 8 H (where H is one horizontal sync period).

Figure 2A:
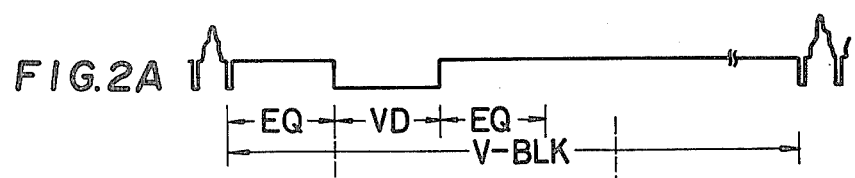
FIGS. 2A and 2B are plots of the wave forms for explaining the movement of the magnetic head.
Figure 2B:

The switching time period Ts is selected to fall within the vertical blanking period V-BLK of the video signals as is illustrated in FIGS. 2A and 2B. In FIG. 2A, the equalizing pulses and the horizontal sync pulses of 0.5 H period are not shown in the vertical blanking period V-BLK. In FIG. 2A, VD represents the vertical sync signal having a duration of 3 H and EQ represents the equalizing pulse duration located in front or behind the vertical sync signal VD. The switching of the scanning position of the magnetic head is performed in response to a switching pulse train which is generated at the leading edge of the vertical sync period signal VD. Since the magnetic disc is rotating, the scanning position moves a distance corresponding to the track pitch Wt during the time interval Ts as illustrated in FIG. 2B.

Figure 3:
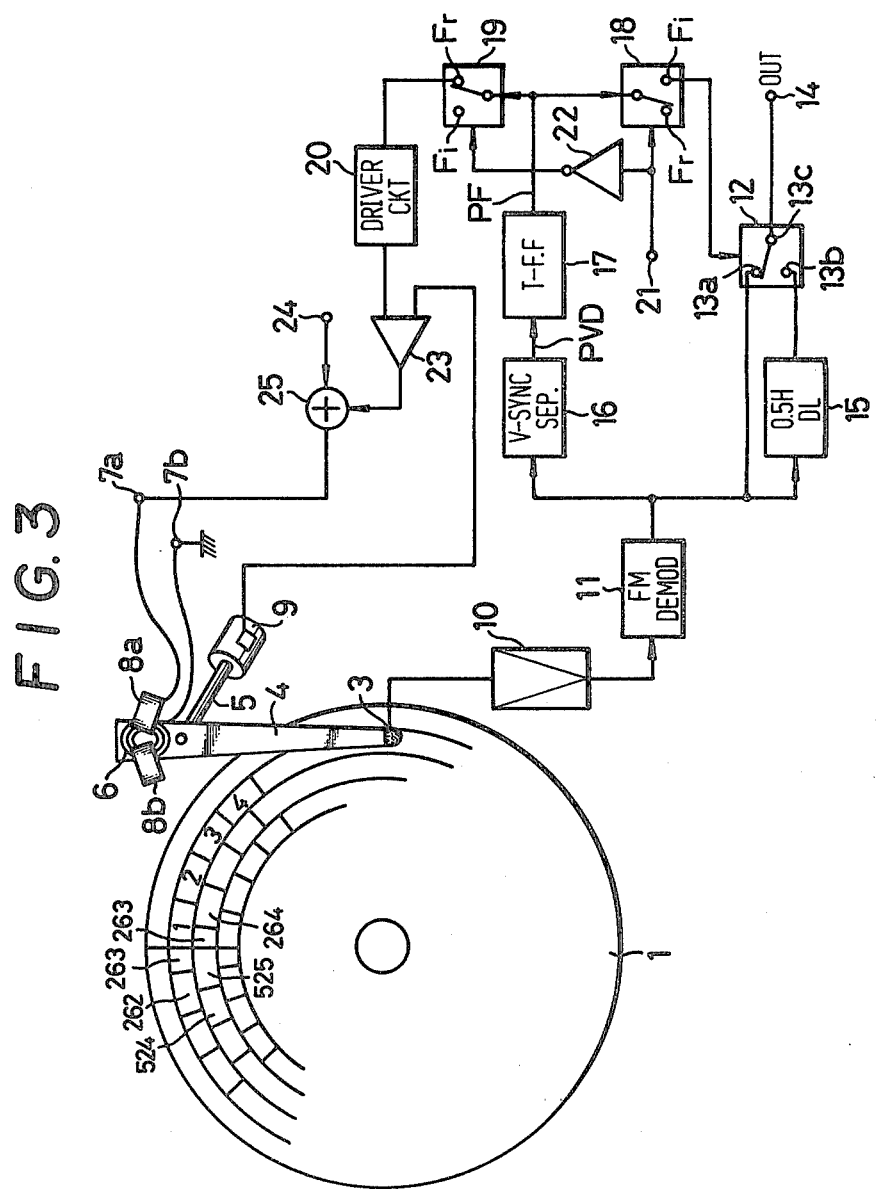
FIG. 3 comprises a block diagram illustrating the still image playback apparatus according to the present invention.

In the present invention, it is possible to obtain one field still image during a single rotation of the magnetic disc 1 or, alternatively, one frame still image constituted of two correlated field images during rotation of the magnetic disc 1 twice. One embodiment of the still image playback system according to the present invention is illustrated in FIG. 3 wherein the first field is recorded in one of two adjacent recording tracks and the second field is recorded on the other of the two adjacent recording tracks. A playback head 3 is mounted on the end of an arm 4 which is adjacent the magnetic disc 1. The arm 4 is pivotally mounted to a shaft 5 and when the arm 4 pivots, the playback head 3 is caused to scan a different recording track on the magnetic disc 1 than it did before it pivoted. The numbers on the magnetic disc 1 illustrated in FIG. 3 represent the horizontal scanning line numbers of TV signals.

As shown in the enlarged view of FIGS. 4A and 4B, a coil 6 is mounted to the end of the arm 4 which is opposite the playback head. Magnets 8a and 8b which are indicated by alternate long and two short dashed lines in FIG. 4A so as to induce magnetic fields in the coil 6 are mounted adjacent the coil 6. When a current is supplied from one end 7a to the other end 7b of the coil 6, the arm 4 will be pivoted due to the electro-magnetic force thus induced. The scanning position moving means consisting of the coil 6 and the magnets 8a and 8b is utilized not only for moving the playback head 3 radially to select one of the recording tracks on the disc 1 but also for moving the playback head 3 across the track by the distance corresponding to the track pitch during the playback of frame still images. Since the playback head 3 pivots about the shaft 5, the distance required for the playback head 3 to move in order to shift to the adjacent recording track may vary and become larger or smaller than the track pitch depending on the position of the playback head relative to the center of the disc 1. In view of this fact, a position detecting means 9 for detecting the rotational angle of the shaft 5 is provided and produces an electrical output signal indicative of this position.

The means for moving the playback head 3 may comprise a feed screw and a feed guide extending in the radial direction of the magnetic disc and to move the playback head 3 in the radial direction along the screw and guide linear tracking can be produced.

The reproduced output signal from the playback head 3 is supplied to an FM demodulator 11 through an amplifier 10. The reproduced video signal is then obtained at the output of the FM demodulator. The reproduced video signal is supplied to an output terminal 14 through one input terminal 13a and the output terminal 13c of a switching circuit 12. The reproduced video signal is supplied to the other input terminal 13b of the switching circuit 12 through a delay circuit 15 which delays the input signal by 0.5 H. A TV monitor not illustrated is connected to the output terminal 14 for viewing the signal.

The reproduced video signal is also supplied to a vertical sync separator 16 which separates a reproduced vertical sync signal PVD from the input signal. A T-type flip-flop 17 receives the output of separator 16 and is triggered by the trailing edge of the reproduced vertical sync signal PVD. The output of the T-type flip-flop 17 produces a pulse signal PF of one frame period which is inverted at levels of "0" and "1" at each field. FIG. 5A shows the vertical sync signal PVD and FIG. 5B shows the pulse signal PF. The pulse signal PF is supplied to the switching circuit 12 through a switching circuit 18 and to a driver circuit 20 through a switching circuit 19.

When the apparatus is in the mode for reproducing the field still image, the switching circuit 18 is moved to the Fi position and the switching circuit 19 is moved to the Fi position. During the mode for reproducing the frame still image, the switching circuit 18 is moved to the Fr position and the switching circuit 19 is moved to the Fr position as illustrated in the Figure. So as to perform this control, a mode specifying signal is supplied to the switching circuit 18 from a terminal 21. At the same time, the mode specifying signal is inverted by an inverter 22 and then supplied to the switching circuit 19. The driver circuit 20 generates a drive signal which has different levels when the level of the pulse signal PF illustrated in FIG. 5B is at level "1" than when the level of the pulse signal PF is at "0". The difference in level of the drive signal is selected so that the playback head can be moved a distance corresponding to the track pitch Wt. The driver signal is supplied to a compensating amplifier 23 which superimposes the detected signal from the position detecting means 9 on the drive signal. A drive signal for moving the playback head to a predetermined track is supplied to an adder 25 from a terminal 24. The drive signal for moving the playback head by the track pitch is also supplied to the adder 25. The adder combines these two drive signals and supplies the obtained signal to one end 7a of the coil 6. The other end 7b of the coil 6 is connected to ground.

In the embodiment described above, in the mode for reproducing frame still images wherein the switching circuits 18 and 19 are in the positions illustrated in FIG. 3, a predetermined track of the magnetic disc is selected according to the drive signal supplied from the terminal 24. When this track is once reproduced, the playback head 3 will be moved to an adjacent track which is located inwardly of the selected track. This movement of the playback head 3 is controlled by the pulse signal PF and the movement is performed within the switching time interval Ts after the reproduced vertical sync signal PVD as illustrated in FIG. 2. Thus, the scanning paths of the playback head 3 will be as indicated by paths R1 and R2 in FIG. 1. Although the reproduced video signal during the switching of the track is temporarily disturbed, no problem is presented since this disturbance occurs within the vertical blanking period. When the second track is reproduced once, the pulse signal PF is inverted. In response to the inverted pulse signal PF, the playback head 3 will then return to the original track. By repeating such operation, a frame still image signal of high resolution is obtained at the output terminal 14 in which the first field and the second field containing correlated data are alternately repeated.

When the mode specifying signal supplied to the terminal 21 is changed to call for a field still image playback by the control switch or other control means and when the video signals for one field recorded on each track are to be reduced from the magnetic disc 1, the switching circuit 18 is moved to the Fi position and the switching circuit 19 is moved to the Fi position.

Then even when the pulse signal PF is supplied, the playback head 3 will not move and the playback head 3 remains constantly on the selected track for playback. The switching circuit 12 is controlled by the pulse signal PF. When the reproduced video signals for one field have been obtained at the input terminal 13a and output terminal 13c of switching circuit 12 will be switched and the input terminal 13b will be connected to the output terminal 13c. Then a reproduced video signal is obtained which is delayed by 0.5 H of the delay circuit 15. In this manner, the reproduced video signals obtained at the output terminal 14 will be interlaced. It is to be seen from the description of the embodiment that the present invention provides a still image playback apparatus which is capable of selectively reproducing field still images and frame still images merely by operating switches. Thus, either the field still image or the frame still image can be selected to be reproduced depending upon the purpose of the playback, the type of still images to be recorded and so forth. According to the present invention it is not necessary to change the rotational frequency of the disc 1 or to use a plurality of playback heads and to switch the outputs from the heads to obtain these two separate modes. Thus, the invention provides a simple playback apparatus for both field still and frame still images.

It is to be realized, of course, that it is possible to incorporate two magnetic heads to induce a magnetic disc for recording the frame still images. It is to be understood also that the present invention can also be utilized for color video signals.

Although the invention has been described with respect to preferred embodiments, it is not to be so limited as changes and modifications can be made which are within the full intended scope of the invention as defined by the appended claims.

I claim as my invention:

1. A still image playback apparatus comprising, a single playback head which can be controlled by a head positioning means and is mounted adjacent a disc-like recording medium which is rotated at a field frequency and has a plurality of concentric tracks and on each track video signals for one field period are recorded, said playback head movable by said head positioning means from one of said tracks to an adjacent track, so that video signals of one still frame image corresponding to two field periods of standard television signals are obtained during playback from said playback head when said recording medium is rotated twice, wherein said playback head moves between said one track to said adjacent track with a timing synchronous with the reproduction of a vertical sync signal of a standard television signal, and wherein said playback head moves during a vertical blanking interval of the standard television signal.

2. An apparatus according to claim 1, further comprising a switching circuit for switching between a mode for reproducing an image of one frame with two correlated fields and a mode for reproducing an image of one field.

3. An apparatus according to claim 2, further comprising a delay circuit for delaying the video signal reproduced from said recording medium by an interval corresponding to one-half a horizontal period.

4. A still image playback apparatus for reproducing a still field image or a still frame image comprising, a magnetic recording medium with a plurality of concentric magnetic tracks with a field recorded on each track and a frame recorded on a pair of adjacent tracks, a playback head, means for supporting and moving said head adjacent one of said tracks and for selectively moving it to a position adjacent another track for reproducing a still frame image from said pair of adjacent tracks, an FM demodulator receiving an output of said playback head, means for detecting the end of a field, and switching means connected to said means for detecting the end of a field and to said moving means for said playback head and said switching means movable to a first position wherein said playback head remains adjacent one of said tracks to reproduce a still frame and to a second position wherein said playback head remains adjacent one of said tracks for one field and then moves adjacent another of said tracks for a second field to reproduce a still frame image.

5. A still image playback apparatus for reproducing a still field image or a still frame image comprising, a magnetic recording medium with a plurality of concentric magnetic tracks with a field recorded on each track and a frame recorded on a pair of adjacent tracks, a playback head, means for supporting and moving said head adjacent one of said tracks and for selectively moving it to a position adjacent another track for reproducing a still frame image from said pair of adjacent tracks, an FM demodulator receiving an output of said playback head, means for detecting the end of a field, and switching means connected to said means for detecting the end of a field and to said moving means for said playback head and said switching means movable to a first position wherein said playback head remains adjacent one of said tracks to reproduce a still frame and to a second position wherein said playback head remains adjacent one of said tracks for one field and then moves adjacent another of said tracks for a second field to reproduce a still frame image, and wherein said supporting and moving means includes a magnetic coil and a magnet and the output of said means for detecting the end of a field connected to said magnetic coil when said switching means is in said second position.

6. A still image playback apparatus according to claim 5, including a position detecting means for detecting the position of said head and means for combining the output of said position detecting means with a command signal for selecting a still frame image.

7. A still image playback apparatus according to claim 6, wherein said means for detecting the end of a field comprises circuit means for detecting the vertical blanking signal.

* * * * *